US012730739B2

(12) United States Patent
Sahu et al.

(10) Patent No.: US 12,730,739 B2
(45) Date of Patent: Sep. 8, 2026

(54) AUTOMATIC UPDATE OF USER INTERFACE ELEMENT IDENTIFIERS FOR SOFTWARE ARTIFACT TESTS

(71) Applicant: SAP SE, Walldorf (DE)

(72) Inventors: Rohan B Sahu, Bhubaneswar (IN); Manan Dey, Guwahati (IN); Manu Jose Philip, Trivandrum (IN); Archana Taneja, Dehradun (IN); Naveen V, Hariharapura (IN)

(73) Assignee: SAP SE, Walldorf (DE)

( * ) Notice: Subject to any disclaimer, the term of this patent is extended or adjusted under 35 U.S.C. 154(b) by 294 days.

(21) Appl. No.: 18/404,753

(22) Filed: Jan. 4, 2024

(65) Prior Publication Data

US 2025/0225060 A1 Jul. 10, 2025

(51) Int. Cl.
*G06F 11/07* (2006.01)
*G06F 11/36* (2025.01)
*G06F 11/3668* (2025.01)

(52) U.S. Cl.
CPC ...... *G06F 11/3688* (2013.01); *G06F 11/3684* (2013.01)

(58) Field of Classification Search
CPC ............. G06F 11/3688; G06F 11/3684; G06F 11/3692
See application file for complete search history.

(56) References Cited

U.S. PATENT DOCUMENTS 11,734,165 B1 * 8/2023 Schreiber ............ G06F 11/3698 717/124
2020/0301815 A1 * 9/2020 Mola ....................... G06F 9/455
2020/0371903 A1 * 11/2020 Straub ................. G06F 11/3676
2021/0390011 A1 * 12/2021 Cser ......................... G06N 3/08

* cited by examiner

*Primary Examiner* — S. Sough
*Assistant Examiner* — Mohammad H Kabir
(74) *Attorney, Agent, or Firm* — Klarquist Sparkman, LLP

(57) ABSTRACT

The present disclosure provides techniques and solutions for automatically correcting software tests. When a test failure is detected, it is determined whether a screenshot or code associated with a second version of a software artifact includes a user interface element that has a semantically equivalent identifier to a user interface element in a screenshot or code associated with a first version of the software artifact. Identifying a semantically equivalent identifier can include determining a section of the user interface, in the screenshot of the code, of the first version of the software artifact where the user interface is located and searching the corresponding section of the user interface of the second version of the software artifact. A definition of the software test can be updated to reference the semantically equivalent user interface element.

20 Claims, 13 Drawing Sheets

600

```
<!DOCTYPE html>
<html lang="en">
<head>
   <meta charset="UTF-8">
   <meta name="viewport" content="width=device-width, initial-scale=1.0">
   <title>Manage Cost Centers</title>
   <style>
      /* General styles and specific toolbar styles */
   </style>
</head>
<body>

<header>
   <!-- Top Bar with Logo and Navigation -->
   <nav>
      <!-- Navigation items like Home, Apps, Search -->
   </nav>
</header>

<main>
   <section id="searchFilters">
      <!-- Section for Search and Filtering -->
      <input type="text" id="searchField" placeholder="Search">
      <!-- Additional filters for Editing Status, Cost Center, etc. -->
   </section>

   <section class="toolbar" id="actionToolbar">
      <!-- Action Buttons -->
      <button class="toolbar-button" id="copyButton" aria-label="Copy">Copy</button>
      <button class="toolbar-button" id="whereUsedButton" aria-label="Where
Used">Where Used</button>
      <button class="toolbar-button" id="changeLogButton" aria-label="Change
Log">Change Log</button>
      <button class="toolbar-button" id="addButton" aria-label="Add">Add</button>
      <button class="toolbar-button" id="deleteButton" aria-label="Delete">Delete</
button>
   </section>

   <section id="costCentersList">
      <!-- Content area for the cost centers list, potentially a table or other structure -->
   </section>
</main>

<footer>
   <!-- Page footer content -->
</footer>
```

```
<script>
   // JavaScript for handling the button click events
   document.getElementById('copyButton').addEventListener('click', function() {
      alert('Copy button clicked!');
   });
   document.getElementById('whereUsedButton').addEventListener('click', function() {
      alert('Where Used button clicked!');
   });
   document.getElementById('changeLogButton').addEventListener('click', function() {
      alert('Change Log button clicked!');
   });
   document.getElementById('addButton').addEventListener('click', function() {
      alert('Add button clicked!');
   });
   document.getElementById('deleteButton').addEventListener('click', function() {
      alert('Delete button clicked!');
   });
   // More scripts can be added as needed for functionality
</script>

</body>
</html>
```

FIG. 6B

```
                                                                700
- Document
  - html
    - head
      - meta (charset="UTF-8")
      - meta (name="viewport" content="width=device-width, initial-scale=1.0")
      - title (Manage Cost Centers)
      - style (/* CSS styles */)
    - body
      - header
        - nav
          - ... (Navigation items)
      - main
        - section#searchFilters
          - input#searchField (type="text" placeholder="Search")
724       - ... (Other filter controls)
        - section.toolbar#actionToolbar
          - button.toolbar-button#copyButton (aria-label="Copy")          720
            - Text ("Copy")
          - button.toolbar-button#whereUsedButton (aria-label="Where Used")
            - Text ("Where Used")
          - button.toolbar-button#changeLogButton (aria-label="Change Log")
710         - Text ("Change Log")
          - button.toolbar-button#addButton (aria-label="Add")
            - Text ("Add")
          - button.toolbar-button#deleteButton (aria-label="Delete")
            - Text ("Delete")
        - section#costCentersList
          - ... (Table or list content)
      - footer
        - ... (Footer content)
      - script (/* JavaScript event handlers */)
```

FIG. 7

AUTOMATIC UPDATE OF USER INTERFACE ELEMENT IDENTIFIERS FOR SOFTWARE ARTIFACT TESTS

FIELD

The present disclosure generally relates to software testing.

BACKGROUND

Software programs can be exceedingly complex. In particular, enterprise level software applications can provide a wide range of functionality, and can process huge amounts of data, including in different formats. Functionality of different software applications can be considered to be organized into different software modules. Different software modules may interact, and a given software module may have a variety of features that interact, including with features of other software modules. A collection of software modules can form a package, and a software program can be formed from one or more packages.

Given the scope of code associated with a software application, including in modules or packages, software testing can be exceedingly complex, given that it can include user interface (UI) features and "backend" features and interactions therebetween, interactions with various data sources, and interactions between particular software modules. It is not uncommon for software that implements tests to require substantially more code than the software that is tested.

Increasingly, software testing is being automated, as the sheer number of tests to be performed can be impractical to perform manually. In addition, release cycles are becoming shorter, meaning that there is less time for testing to be performed.

While automated tests can be beneficial in a number of ways, issues can arise. For example, information used for test execution can change, which can cause test scripts to fail. For example, an automated test may search code of a web-based application for a particular UI element to be selected or confirmed as present. However, if the UI element is renamed, for example, the test script may fail, even though the underlying functionality of the software is the same. That is, the test would execute correctly if the UI element would simply be renamed. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present disclosure provides techniques and solutions for automatically correcting software tests. When a test failure is detected, it is determined whether a screenshot or code associated with a second version of a software artifact includes a user interface element that has a semantically equivalent identifier to a user interface element in a screenshot or code associated with a first version of the software artifact. Identifying a semantically equivalent identifier can include determining a section of the user interface, in the screenshot of the code, of the first version of the software artifact where the user interface is located and searching the corresponding section of the user interface of the second version of the software artifact. A definition of the software test can be updated to reference the semantically equivalent user interface element.

In one aspect, the present disclosure provides a process of automatically updating software tests based on a change to a user interface element of a tested user interface, reflected in a software artifact. A first instance of a software test is executed on a software artifact. The software test includes one or more operations to manipulate a user interface element or to confirm content of a user interface element defined in code of a first version of the software artifact. It is determined that a first operation of the one or more operations failed, being a failed operation. An identifier assigned to a first user interface element associated with the failed operation is determined. Code for a second version of the software artifact or a screenshot of a user interface associated with execution of the failed operation is analyzed to determine a second user interface element corresponding to the first user interface element. The software test is modified to specify the second user interface element in the first operation in place of the first user interface element.

The present disclosure also includes computing systems and tangible, non-transitory computer-readable storage media configured to carry out, or includes instructions for carrying out an above-described method. As described herein, a variety of other features and advantages can be incorporated into the technologies as desired.

BRIEF DESCRIPTION OF THE DRAWINGS

FIG. 3A is an example user interface screen illustrating test execution results for a failed test, while

FIGS. 6A and 6B provides example HTML code for the user interface screen of FIG. 4.

FIG. 7 provides code of a document object model generated from the HTML code of FIGS. 6A and 6B.

DETAILED DESCRIPTION

Example 1—Overview

Figure 1:
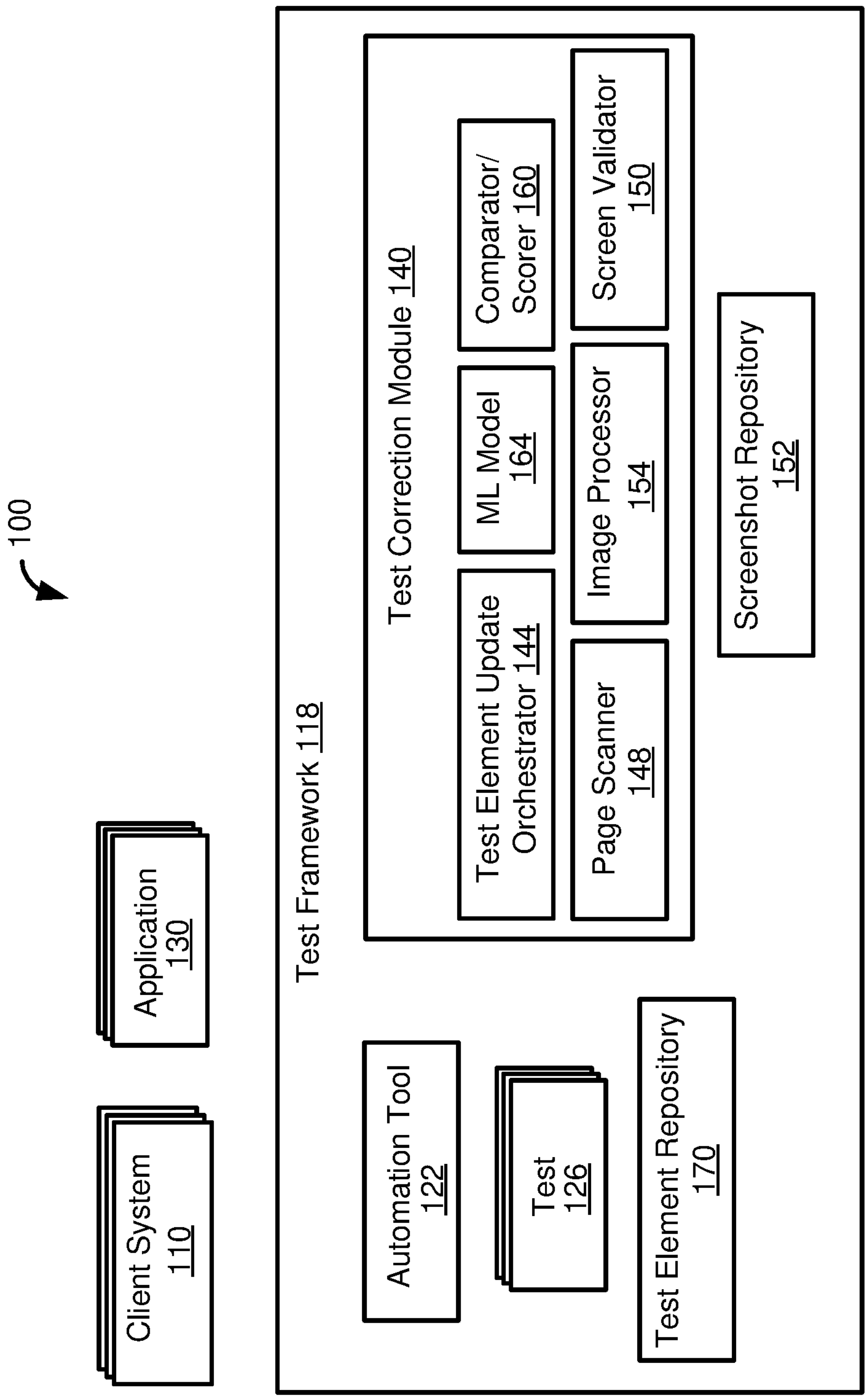
FIG. 1 is a diagram of a computing environment in which disclosed techniques can be implemented, including a test correction module that can be used to automatically correct or update software tests.

Software programs can be exceedingly complex. In particular, enterprise level software applications can provide a wide range of functionality, and can process huge amounts of data, including in different formats. Functionality of different software applications can be considered to be organized into different software modules. Different software modules may interact, and a given software module may have a variety of features that interact, including with features of other software modules. A collection of software modules can form a package, and a software program can be formed from one or more packages.

Given the scope of code associated with a software application, including in modules or packages, software testing can be exceedingly complex, given that it can include user interface (UI) features and "backend" features and interactions therebetween, interactions with various data sources, and interactions between particular software modules. It is not uncommon for software that implements tests to require substantially more code than the software that is tested.

Increasingly, software testing is being automated, as the sheer number of tests to be performed can be impractical to perform manually. In addition, release cycles are becoming shorter, meaning that there is less time for testing to be performed.

While automated tests can be beneficial in a number of ways, issues can arise. For example, information used for test execution can change, which can cause test scripts to fail. For example, an automated test may search code of a web-based application for a particular UI element to be selected or confirmed as present. However, if the UI element is renamed, for example, the test script may fail, even though the underlying functionality of the software is the same. That is, the test would execute correctly if the UI element would simply be renamed. Accordingly, room for improvement exists.

In the case of manual testing, a tester could easily identify the source of an issue and determine the changed UI element that should be selected. For example, if a UI button to create a new transaction was originally labelled "add," and it was changed to "create" during development, a user could determine that the name of the UI element had changed, and could simply select/update the test definition to use the "create" UI element. The tester could determine this intuitively based on, for example, the position of the UI element and the semantics of the two names. That is, a tester would understand that "create" and "add" have similar meanings. In addition, if the "create" UI element was located at the same position as the prior "add" element, the tester would further intuit that the "create" command would have the same functionality as the "add" command.

However, typical automated test execution software is not capable of adapting to such changes. For example, an automation script may be designed to look for the "add" UI element. If the "add" UI element cannot be found the test will fail. If the test fails, a user would need to identify that the test failed and review test execution details to determine why the test failed, including determining that the test failed because of an "error" in the test script (in this case, the test script not being updated to reflect the new name for the UI element), rather than an error being present in the tested code.

Although a user could manually adjust test scripts, it can be seen how performing this process manually would be prohibitively time consuming. In addition, as noted, often many tests are designed for particular software functionality. A change to an identifier for a UI element can cause multiple tests to fail, requiring even more developer time to adjust the tests, and wasting computing resources in executing tests that fail and then reexecuting updated tests.

The present disclosure provides techniques that can automatically update tests to account for test failures, particularly those based on changes to labels to UI elements. In general, disclosed techniques provide for updating tests defined for software artifacts. As used herein, a "software artifact" encompasses all products and byproducts of the software development and maintenance process, including but not limited to source code, class definitions, header files, main programs, library files, JSON objects, executable files, configuration files, documentation, test scripts, deployment scripts, data models, UIs, graphical assets, and database schemas, representing every tangible output in the software lifecycle.

The disclosure primarily proceeds with a discussion of web applications. A web application, often abbreviated as "web app," is a software application designed to be accessed and operated through a web browser using internet protocols like HTTP. It can run over the Internet, on a local server, or within a local network. Unlike traditional desktop applications, web apps do not need to be installed on a user's device (but can be) and can be accessed from various platforms and locations. They can operate remotely on Internet servers, be hosted locally on a user's device as a "localhost" application, or serve specific user groups within an organization through an intranet. Web applications are characterized by their platform independence, accessibility, client-server architecture, and the use of web technologies for UI and interactivity.

However, disclosed techniques can be adapted to be used with other types of applications. As will be discussed, disclosed techniques can analyze code for a web page to look for a UI element that corresponds to a UI element that could not be located and resulted in test failures. Similar techniques can be employed with other types of code, such as JAVA code, provided that UI elements are associated with information identifying a programmatic element as a UI element and a label for the UI element.

In a simple configuration, disclosed techniques involve tests implemented at least in part through a series of automated interactions with a UI. These tests can be implemented as test scripts, where a test script can be manually defined or can be produced using low code/no code techniques. For example, many testing platforms provide functionality for recording user interactions with a UI and creating a script that can be replayed based on that recording. In the case of web applications, test case execution can be facilitated using technologies such as SELENIUM (Software Freedom Conservancy) or START or STEP (both SAP SE). At least certain test execution software, including SELENIUM, can be operated in a "headless" mode, where a test is executed on a web application without the generation of a UI.

The test can specify particular actions to be taken with respect to particular UI elements, where a given UI element can be associated with one or more identifiers. In some cases, an identifier is unique/specific to a single UI element. In other cases, an identifier can distinguish a UI element from certain other UI elements, but may be broad enough to embrace multiple UI elements. As an example, a UI element may be associated with a particular programmatic class or type, such as a radio button. Thus, providing an identifier of a radio button class can distinguish a radio button UI element from other types of UI elements, such as a drop-down list. If a web application includes a single radio button, then simply providing the UI element class may uniquely identify a radio button. However, if there are multiple radio buttons in a UI, providing the class would not specify a single UI element.

At least a portion of test operations are typically performed sequentially. Thus, test failure can often be associated with a particular UI interaction, such as an interaction with a particular UI element. In many cases, test execution software generates messages or log entries regarding test failure. Thus, a log entry may be available that indicates that a particular test step failed because a particular UI element could not be located. In automated testing, often screenshots are available for different UI versions, and for UIs associated with successful or unsuccessful test execution. In particular, testing software may capture a screenshot of a UI when a test failure is identified. As will be described, these screenshots can be used in determining whether a new UI element may correspond to a previously specified UI element that can no longer be identified.

The screenshot, or the tested version of the application otherwise accessed, can be analyzed to determine whether the updated UI includes a control that corresponds to the UI element that could not be found during test execution. A variety of techniques for identifying possible "updated" UI elements will be described as the specification proceeds, as well as techniques for determining whether such UI elements are likely to correspond to the "missing" UI element.

If an updated UI element is identified, a variety of actions can be taken. For example, a test whose execution failed because of the missing UI element can be reexecuted with the updated UI element. The test definition can be modified so that future test executions will not fail because of the updated UI element. As noted above, multiple tests can use a given UI element. If it is determined that a test failed because of a change to a UI element, other tests can be identified that use that UI element, and those tests can be modified to use the updated UI element, prospectively avoiding test failure.

If no suitable UI element can be identified for the "missing" control, the test can be marked as failed, and optionally an additional alert can be provided to notify a developer that one or more tests may need updating. In a further implementation, if a test fails because a UI element cannot be located, other tests that use that UI element can be cancelled or postponed pending a remedial action.

Example 2—Example Computing Environment with Test Correction Module

FIG. 1 illustrates an example computing environment 100 in which disclosed techniques can be implemented. The computing environment 100 includes one or more client computing systems 110 that are in communication with a test framework 118. The test framework 118 includes one or more automation tools 122, such as SELENIUM (Software Freedom Conservancy) or STEP or START (both of SAP SE). The one or more automation tools 122 are configured to execute tests 126. As described, the tests 126 are in the form of computer-executable instructions or operations to be performed on a particular software application 130, such as a web application.

The automation tools 122 are in communication with a test correction module 140. In particular, the automation tools 122 and the test correction module 140 communicate such that the test correction module obtains information regarding test failures encountered by the automation tools. When a test failure is detected, the test failure can trigger operations by a test element update orchestrator 144.

Operations performed or orchestrated by the test element update orchestrator 144 can include scanning a web page of a web application, or UI code for another type of application. That is, scanning a web page can include scanning HTML code or document object model (DOM) code for a web page. Scanning the web page can be performed by a page scanner 148. The page scanner 148 can be used for a variety of purposes, including to obtain information useable by a screen validator 150 to confirm whether a screenshot taken during test failure corresponds to a web page associated with the relevant web application. That is, the page scanner 148, or information provided by the page scanner, can be used to confirm that the test was performed on the correct application 130.

Screenshots used by the screen validator 150, or as part of updating a test using screenshots to identify updated UI elements, can be stored in a screenshot repository 152. In particular, screenshots can be captured automatically during test execution, including for both failed tests or successful tests, and stored in the screenshot repository 152.

The page scanner 148 can also be used to extract identifying information for at least a portion of UI elements associated with an application 130. As will be described, the page scanner 148 can scan an entire web page (or other UI screen/code defining a UI), or can be configured to scan a subset of the web page. For example, it can be beneficial to look for an updated/replacement UI element in the same section in which the missing UI element was located. In that respect, the page scanner 148 can be configured to review both a current version of a web page, associated with test failure, and a prior version of the web page that included the missing UI element.

In some cases, the code for the original version of the web page, or the modified version of the web page, may not be available. In such cases, an image processor 154 can be used to extract identifiers of UI elements. The image processor 154 may also be used to analyze particular sections of a web page. Typically, when updating an application 130, developers try to avoid making major changes to the UI, such as the locations of UI elements. Thus, a process of identifying a replacement UI element can be expedited (with accompanying savings in computing resources) by limiting a number of candidate UI elements to be evaluated, while also potentially increasing the accuracy of the process.

In comparing a missing UI element to candidate UI elements, the test element update orchestrator 144 can call a comparator/scorer component 160. The comparator/scorer component 160 can compare a missing UI control to one or more candidate UI elements using a variety of techniques, as will be further described. These techniques can include creating word embedding for textual elements and then calculating a cosine similarity score. As discussed, a most suitable candidate UI element, if found, can be used as a replacement UI element, and identifiers for the missing UI element can be replace with the identifier of the selected candidate UI element.

In some cases, rather than interactive UI elements, a test can confirm whether "affirmations," also referred to as informational UI elements, have been correctly generated. That is, an affirmation can correspond to components such as tooltips or messages that are displayed when a UI element is selected. In some cases, cosine similarity or similar techniques can be used to evaluate candidate informational UI elements. In other cases, more sophisticated techniques can be used, such as calling a natural language inference processor to determine whether a candidate informational UI element entails information in a missing informational UI elements. The natural language inference processor is a particular example of a machine learning model 164 that can be called by the test element update orchestrator 144, or by the comparator/scorer component 160.

The test framework 118 can include a test element repository 170. The test element repository 170 can be used to associate particular test elements, such as an interactive UI element or an informational UI element, with particular tests. As discussed, this information can be used to identify other tests 126 that should be updated when an identifier of a particular UI element changes. In particular the test element repository 170 can be implemented as one or more relational database tables, having a column that identifies a test and a column that identifies a test element.

An identifier of an updated UI element can be used to query the table to identify tests that use that UI element. Those tests can then be updated to use the replacement test element, reflecting the renaming of the prior UI element. The test element repository 170 can then be updated to associate the replacement (renamed) UI element with the tests previously associated with the original UI element. Optionally, the test element repository 170 can include additional information, such as including a column that includes a version identifier or a last modified date, where this information can be used to identify tests that have already been updated.

In another implementation, a test framework 118 can implement tests 126 in a manner where UI elements in tests are linked, such as using a logical pointer, to a central repository, being a particular implementation of the test element repository 170. In these implementations, when an identifier of a UI element is changed, and corrected using the disclosed techniques, the test element repository 170 can be updated with the change, and the nature of the logical pointer results in tests 126 being automatically updated to use the updated UI element.

Example 3—Example User Interfaces and User Interface Code

Figure 2:
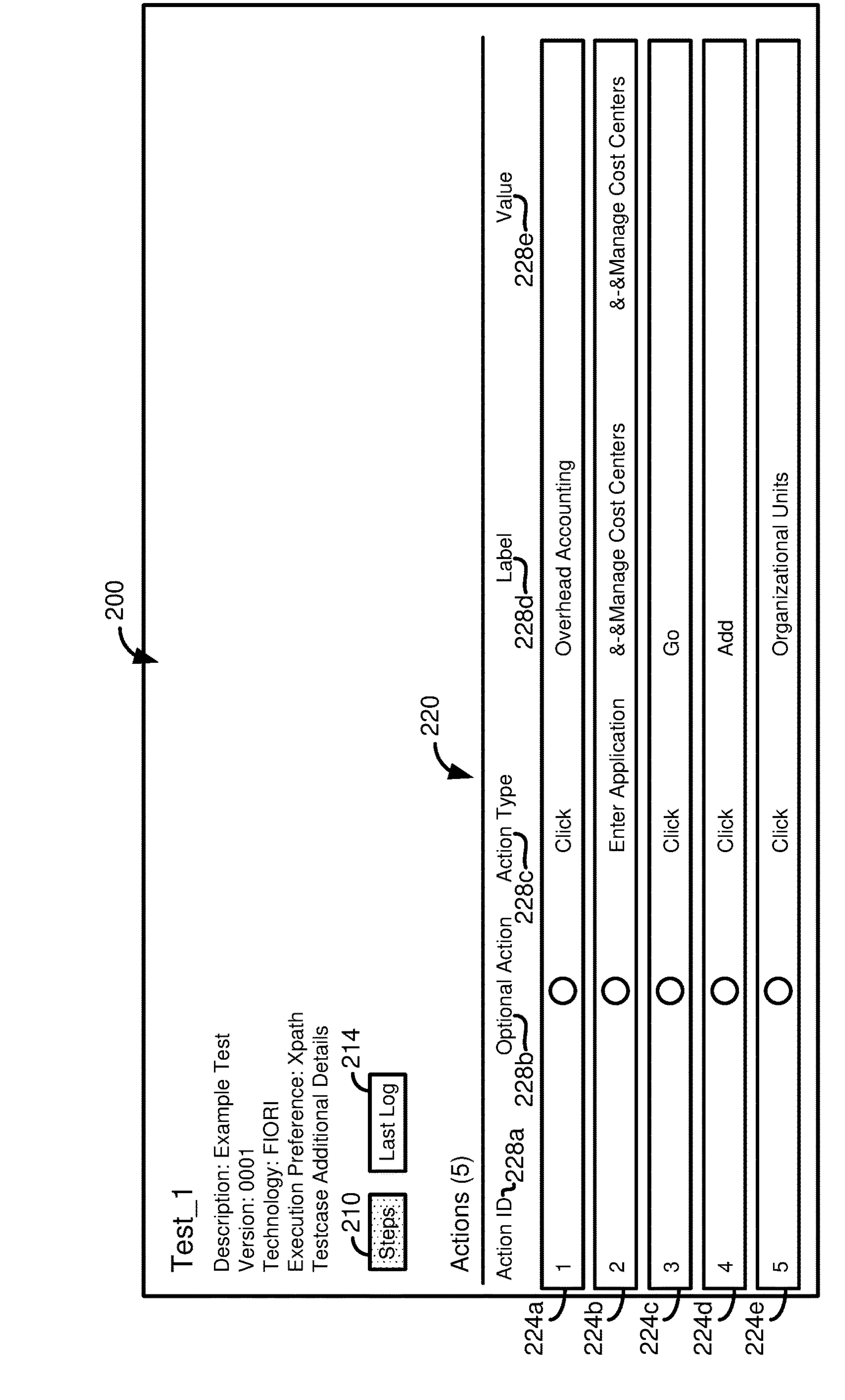
FIG. 2 is an example user interface screen illustrating a definition of a test of a software artifact.

FIG. 2 illustrates an example user interface (UI) 200 that displays a test definition. A UI element 210 is selected, indicating that the UI 200 should display steps associated with a test. Selection of a UI element 214 instead causes a last log associated with execution of the relevant test to be displayed.

In the UI 200, it can be seen that the test has five actions, 224_a_-224_e_, that form rows of a tabular display 220. The tabular display 220 includes columns 228_a_-228_e_. Column 228_a_ provides an action identifier. In the illustrated example, the action identifiers start at 1 and increment by one, corresponding to a sequence in which the actions are performed. Column 228_b_ provides UI elements that can be selected to indicate that certain actions are optional. The meaning of an optional action can vary depending on implementation. In some cases, optional actions can be conditional and only executed under certain conditions. Similarly, in other cases, optional actions can provide for more variety in test execution scenarios. Optional actions can also correspond to actions that will be attempted during test execution, but whose failure will not cause the overall test to fail. For example, if an optional action cannot be performed, the test may just proceed to the next action in a sequence.

Column 228_c_ provides identifiers indicating the specific type of action that an automated test is to perform. These actions can range from those that replicate direct user interactions with the interface, such as clicking on interactive elements or inputting text into form fields, to more intricate behaviors like dragging and dropping items within the interface, hovering over elements to trigger additional content or interactions, or scrolling through content that extends beyond the immediate viewable area. As an example, rows 224_a_ and 224_c_-224_e_ include a "click" action type.

In addition to these direct interaction types, there are actions that do not correspond to a single user action within the UI. For instance, an "Enter Application" action type, as seen in row 224_b_, facilitates the transition from a general software environment to a specific module within that environment. This type of action may correlate with particular functionalities of the testing software or the application under test, potentially encapsulating a series of user actions into one automated step, thus serving as a streamlined method or "shortcut" to achieve a complex series of operations.

Further expanding on this category, these action types can include data retrieval commands, which might direct the test to fetch necessary data from an external source without interacting with the UI. Similarly, assertion commands can be used to verify the state of the UI against expected outcomes or to ensure that certain messages are displayed following an action. Synchronization or wait commands may be employed to pause test execution until certain conditions are met, such as the loading of a web page or the appearance of a UI element.

Other action types of this nature can include setup or teardown commands, used in preparing the testing environment before the commencement of a test and for clearing it afterwards. Parameterization actions allow for the dynamic alteration of test steps based on variable data inputs, facilitating a more versatile data-driven testing approach. API calls can be made to interact with the application's backend services directly, such as sending requests to endpoints, which bypass the need for UI interaction for tasks like user authentication.

Column 228_d_ specifies the label for each action within an automated testing scenario, serving as a key identifier for the targeted UI elements. Direct user interaction equivalents, such as those found in rows 224_c_ and 224_d_, utilize labels like "go" and "add" to denote the interaction with specific command buttons or other controls. These labels can be literal descriptors, matching the text or name attributes of HTML elements, thus guiding the test script to the correct UI element. In some cases, the label acts as a shorthand, referencing more complex identifiers like classes or code-level labels, such as "button.add," which the automation framework interprets to locate the necessary controls.

For abstract action types such as "Enter Application," which was discussed earlier, the label might represent a series of user actions or a specific test framework function that transitions the test's focus to a new application module or state. For instance, an "Enter Application" label could signify a command that triggers a set of background processes within the testing software, effectively bypassing the manual navigation steps a user would typically perform. This label might be associated with specific functionality within the testing framework or the application under test and is not necessarily tied to a visible text attribute on the UI. Instead, it may correlate with a particular method or property within the application's API that the testing framework uses to initiate the transition.

A "Value" column 228*e* of the tabular representation in an automated testing interface can be used to define specific data or parameters that correspond to each action within the test script. As an example, consider the use of the column 228*e* with the use of the "Enter Application" action of row 224*b*, where it specifies the exact module or section of the application the automated test should navigate to. In this scenario, the value, such as "Manage Cost Centers," guides the automation framework to the desired area within the application, ensuring the test is conducted in the correct context.

More broadly, the "Value" column 228*e* can extend to various types of actions within an automated test. For direct user interaction actions, like clicking or text entry, this column can contain the explicit input data required for the action. This might include the text to be entered into a field or specific identifiers for UI elements to be interacted with. In actions that involve assertions or verifications (informational UI elements), the "value" field can specify the expected outcomes, such as the content of a message or the status of a UI element, thereby enabling the test to validate the application's behavior against predefined criteria.

Furthermore, for parameterized or data-driven actions, the "Value" column 228*e* can have a dynamic nature, such as referencing data sets or variables that tailor the test's execution to various data scenarios. This adaptability is useful for tests that need to cover a wide range of input conditions or for ensuring the robustness of the application under test.

In complex actions, similar to the "Enter Application" type, the "Value" serves as a directive or command that instructs the testing framework on the specific operation to perform. It could represent a command to navigate to a different module, trigger a series of background processes, or activate certain functionalities within the application.

Figure 3A:
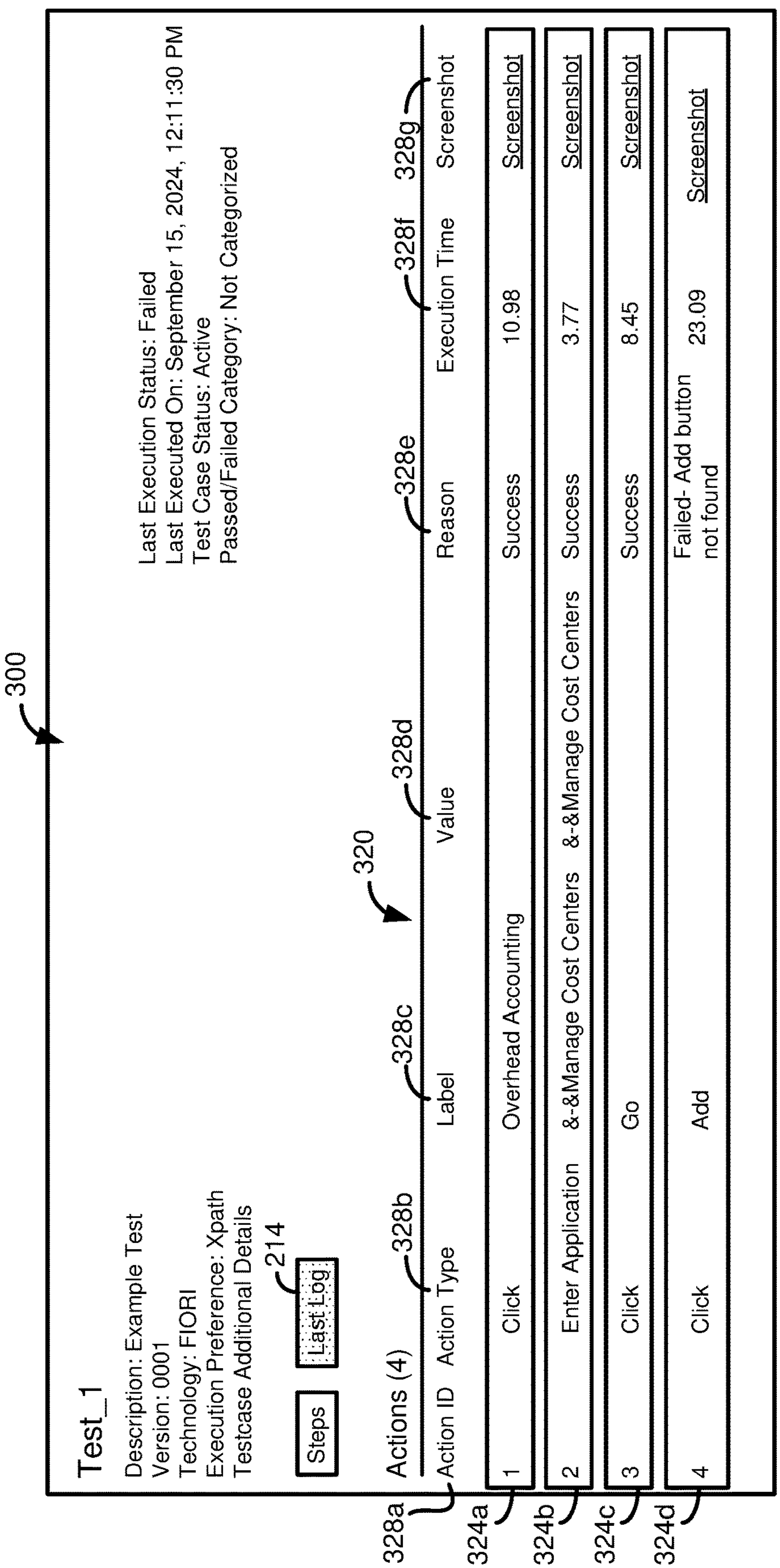

FIG. 3A illustrates a UI 300 that corresponds to the UI 200 after selection of the UI element 214, providing a log of a test execution.

FIG. 3A provides a tabular representation 320 that is similar to the tabular representation 220 of FIG. 2. In this case, rows 324*a*-324*d* correspond to rows 224*a*-224*d*, but represent test execution results in addition to including test definitional information. Columns 328*a*-328*d* correspond, respectively, to columns 228*a* and 228*b*-228*e* of the tabular representation 220. A column 328*e* provides an outcome of a test for a particular test action (row 324 of the tabular representation 320). If an action completed successfully, the column 328*e* can provide a value of "success." If an action failed, the column 328*e* can provide an indication of test failure, optionally along with an explanation of a cause of test failure.

The UI 300 represents a scenario where an "add" button was changed to have a label of "create." Accordingly, column 328*e* provided a "failed" message for row 324*d*, and a message that the add button could not be found.

Column 328*f* of the tabular representation 320 provides a time taken to execute a particular action, while column 328*g* provides a link to a screenshot of the application UI at the point at which test failure occurred. As will be described, the screenshot can be used to update a test based on changes to the UI.

Figure 3B:
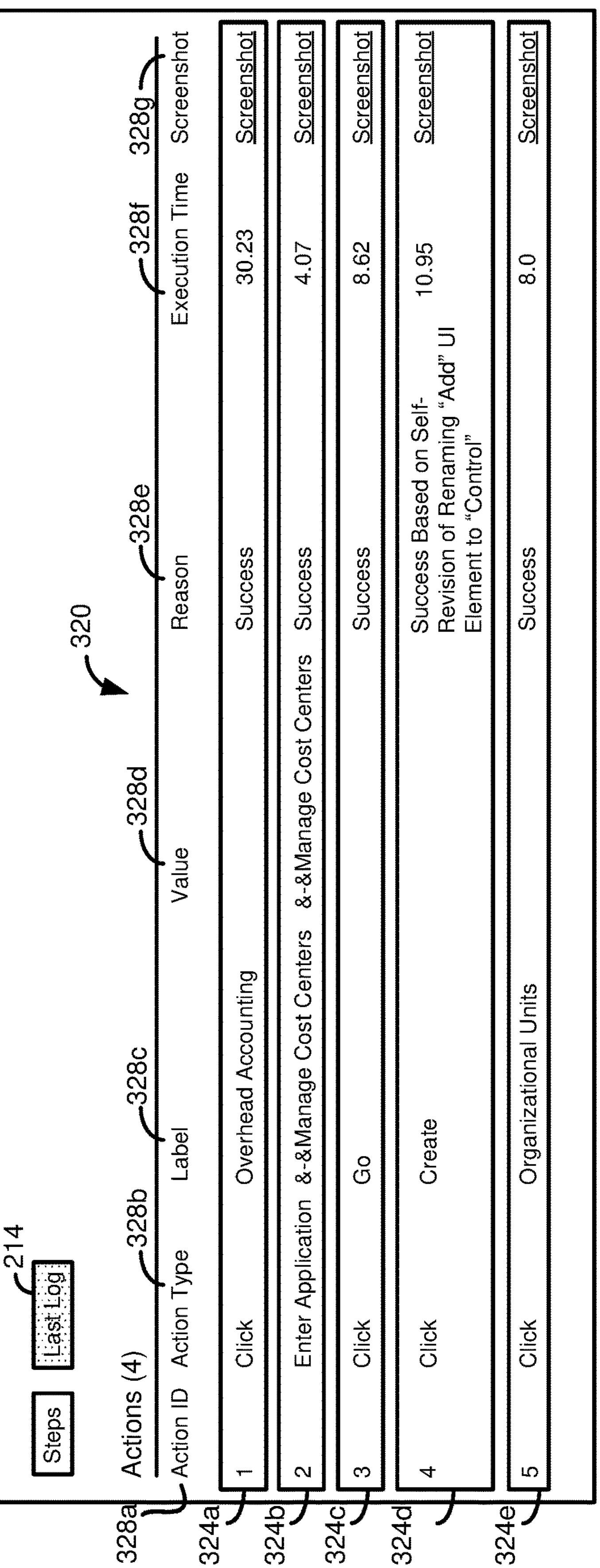
FIG. 3B is an example user interface screen illustrating test execution results after update of a test definition using disclosed techniques.

FIG. 3B illustrates a UI screen 350 that corresponds to a test log analogous to that in the UI screen 300 of FIG. 3A after update of a UI element according to disclosed techniques. The tabular representation now includes a row 324*e*, illustrating that all test steps successfully completed. A value for the column 328*e* for the previously failed step, row 324*d*, indicates that the step now completed successfully after the successful self-update (or self-revision, as shown) of the test using disclosed techniques. Further, the value in the reason column 328*e* for the row 324*d* can provide a more specific description of the changes made, as it can help with log analysis. Here, the reason indicates that the "add" UI element was renamed to "create."

Figure 4:
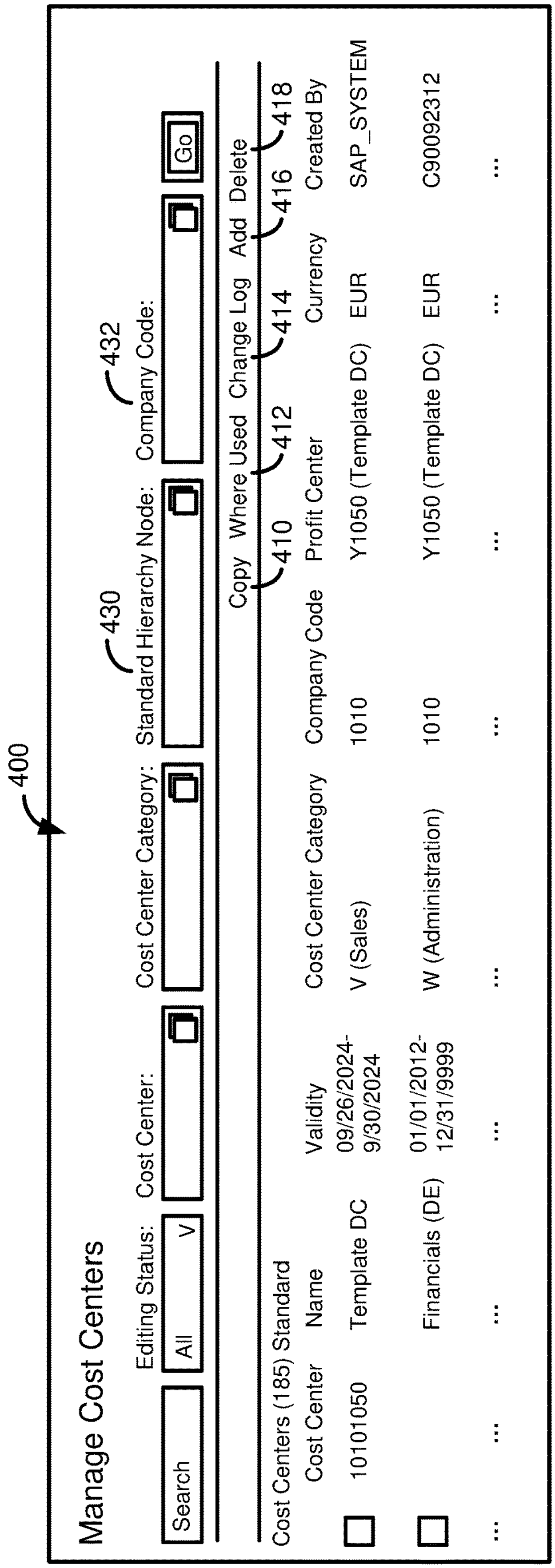
FIG. 4 is an example user interface screen for a first version of a software artifact for which one or more tests are defined.

FIG. 4 illustrates a UI 400 for a web application. The test definition in the UI 200 of FIG. 2 can be defined at least in part for the UI 400. That is, the web application UI 400 can represent a UI that is reached after the "Enter Application" action of row 224*b* is executed. It can be seen that the UI 400 includes an add button 416, which is selected by the "click" action of row 224*d*.

The UI 400 includes additional UI elements 410, 412, 414, 418 which are in the same "section" of the UI. "Section" generally refers to a particular location of a UI, and typically has UI elements that are grouped based on a particular task or purpose. For example, the UI elements 410-418 may represent a first section for a first set of tasks type, while other UI elements, such as UI elements 430, 432 are located in a different area of the UI screen 400, and may be associated with a different type of task. As will be further explained, in some implementations a section associated with missing UI elements can be searched in an updated UI to identify a corresponding UI element with an updated identifier. As an example, if the add UI element 416 cannot be located, the section with the UI elements 410-418 may be analyzed in the updated UI (such as in code for the UI or in a screenshot of the updated UI). However, since the UI elements 430, 432 are located in a different section, that section is not searched for a replacement UI element. However, in some cases, multiple sections of a UI can be searched, or an entire UI can be searched.

Figure 5:
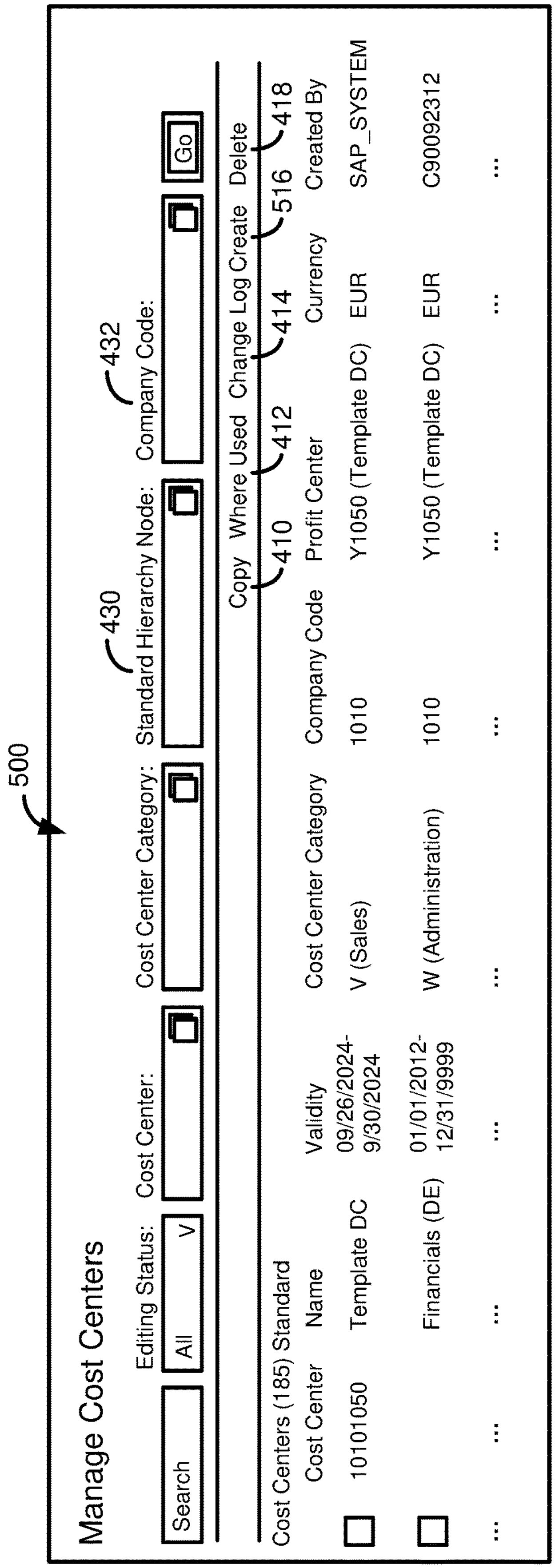
FIG. 5 is an alternative version of the example user interface screen of FIG. 4, after one of the user interface elements has been renamed.

FIG. 5 illustrates a UI 500 for the web application having the UI 400 after updating the UI 400 to change the label of the "add" button 416 to "create," shown as the "create" UI element 516.

FIGS. 6A and 6B provide example HTML code 600 for the UI 400. The "Add" button within the web application interface is defined in HTML using the button element, which acts as an interactive component for user actions. As shown in the code 600, the "Add" button is assigned a class 620 of toolbar-button, indicating that it is part of a toolbar control set. This class is a collective attribute and may be shared with other similar controls, thus it is not automatically unique to the "Add" button. If the "Add" button is the only member of the "toolbar-button" class, it can be used to identify the "Add" button. Otherwise, the class 620 can be used to potentially narrow down a set of UI elements to a subset that includes the "Add" button.

A unique identifier, id attribute 622, is given the value "addButton". This id is used when the button needs to be individually addressed in the DOM (document object model), particularly in the context of automation scripts or when applying specific styles. Automation tools such as SELENIUM can use this id to programmatically initiate the button's click event, triggering any associated actions.

For accessibility purposes, an aria-label attribute 624 with the value "Add" describes the button's function for assistive technologies. The button's visual label, "Add", is text content 626 that users see on the web application UI 400. The visual label 626 is the direct interface between the user and the button's action and is placed between the opening and closing tags of the button element. It is also accessible to automation tools that might rely on visible text for element selection, where commands in these tools can be implemented to interact with the element based on its displayed label.

The code 600 includes section information that can be disclosed techniques, such as where UI elements corresponding to the task of "action" buttons are placed within a section 640, indicated by the opening and closing "section" and "/section" HTML tags.

Code for the "Create" button 516 can be identical to the code 600 for the "Add" button 416, provided that the instances of "Add" described above (as well as other appropriate portions of the code 600) are updated to "Create" in place of "Add".

FIG. 7 provides code 700 for a document object model corresponding to the HTML code 600 of FIGS. 6A and 6B. Lines 710 of the code 700 includes the class 620, the id attribute 622, the aria label attribute 624, and the visual label 626. Again, these values can be used to trigger activation of the "add" functionality, including by automation tools.

The code 700 also includes section information defining a section 720 that corresponds to the section 640 of the code of FIG. 6A. The section definition 720 can be determined both from the tree structure of the DOM, and from the use of the section declaration at line 724 of the code 700.

Example 4—Example Automatic Test Update Process

Figure 8:
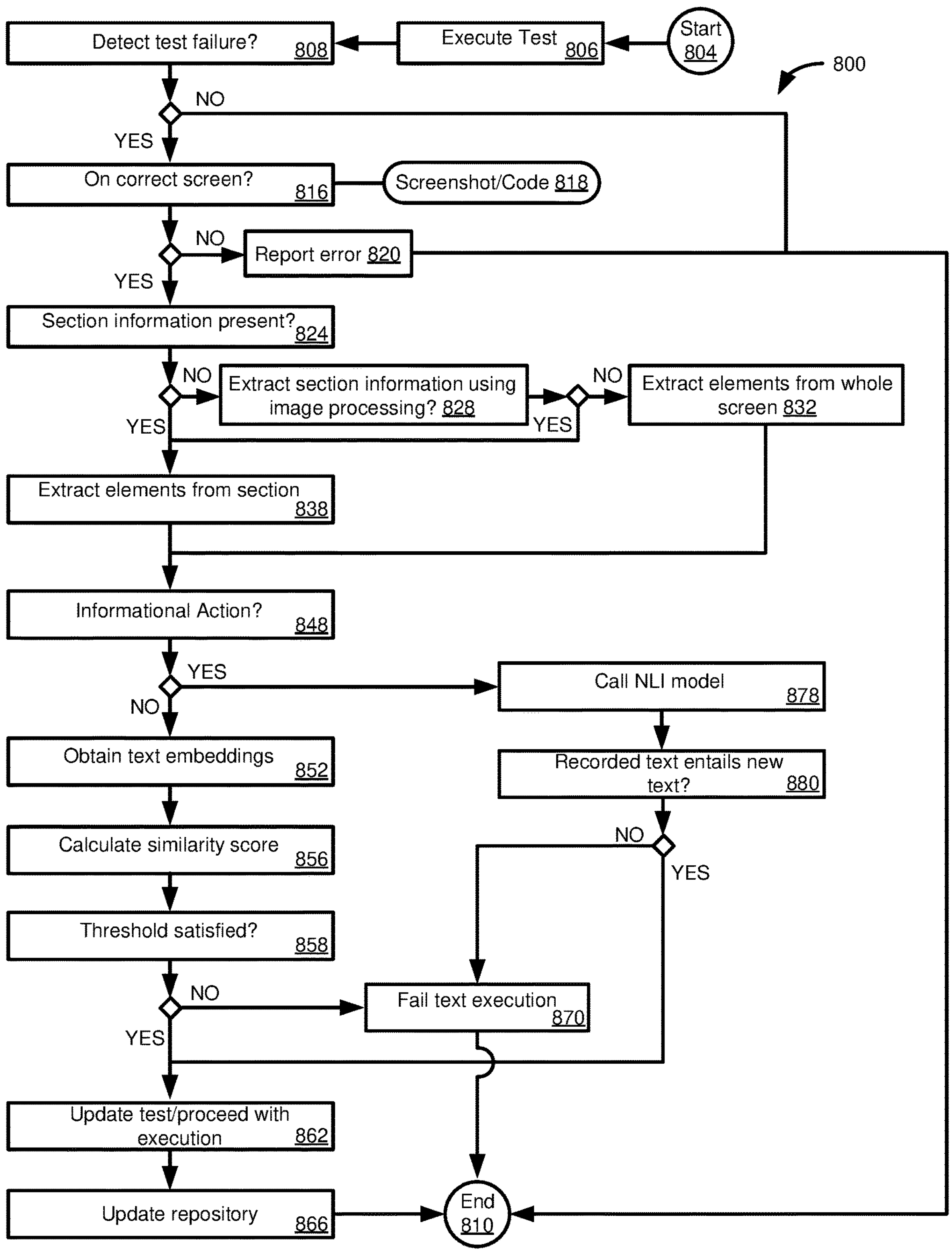
FIG. 8 is a flowchart of a process for updating a software artifact test to account for a change in an identifier of a user interface element.

FIG. 8 provides a flowchart of a process 800 according to the present disclosure. It should be appreciated that the present disclosure includes techniques that do not include all elements of the process 800, or which include additional elements.

The process 800 starts at 804. A test is executed at 806. At 808, it is determined whether the test has failed. It the test has not failed, the process 800 can end at 810. If the test fails, optionally, at 816, it can be determined whether the application is executing the correct UI. Determining whether the application is executing the correct UI can be carried out in a variety of ways, including using a screenshot of the UI captured at, or proximate in time to, test failure, or using code (in the case of a web application, HTML or DOM), collectively indicated as 818.

In the case of a screenshot, a determination of whether the correct UI screen is being executed can be performed using image recognition techniques. For example, the screenshot indicated by 818 can include both a screenshot of the correct UI screen (which can be stored at various points, such as at test definition, or where screenshots are captured during test execution regardless of whether a test failed, in which case the screenshot can be from a prior successful test). Image recognition techniques can be used to compare the entire UI screen to determine whether the screens are identical, or the technique can compare one or more specific portions of the two screen versions, such as a section of the UI that contains the UI element associated with test failure.

The comparison of a UI screen captured at test failure and a reference screenshot, which represents the correct or expected UI state, can use comparison algorithms that employ image processing techniques to identify differences between the two screenshots. These techniques may include pixel-by-pixel comparison, pattern recognition, or more advanced methods like machine learning algorithms trained to recognize specific UI elements and layouts. The algorithm evaluates the degree of similarity between the two images, with a high degree of similarity indicating that the user is on the correct screen. The decision at 816 can include criteria, such a similarity score, that can be used to determine whether the two screenshots are the same for the purposes of the process 800.

In contrast, when comparing subsections of the screen, the focus is on the particular UI elements, such as buttons, text fields, or other interactive elements, that are associated with an action that resulted in test failure. This method is particularly useful in complex UIs where only certain parts of the screen are relevant for the functionality being tested. In determining a region of interest (ROI), the process 800 can first identify key, relevant UI elements, such as a particular UI element that resulted in test failure.

Once the key elements are identified, the process 800 extracts their surrounding image context. This step can include defining a bounding box or a similar demarcation around the missing UI element, which captures not only the element itself but also a portion of its surrounding area. The size and shape of this bounding box can be dynamically adjusted based on the "target" UI element's size and the layout characteristics of the application.

The ROI, defined by the bounding boxes around the relevant UI elements, is then extracted from both the current and reference screenshots. A comparison algorithm is applied to these extracted subsections, focusing on identifying discrepancies that may indicate the user is on an incorrect screen. In some cases, optical character recognition or similar techniques can be used to determine whether the text of UI elements proximate the target UI element are the same between both versions of the ROI. As with the technique where entire screenshots are compared, a ROI comparison technique can be implemented with various degrees of tolerance for differences, allowing for flexibility in scenarios where minor UI changes do not necessarily indicate an incorrect screen. Additionally, the technology can be adapted to different screen resolutions and orientations, which can allow it to better determine whether the test was on the correct UI screen when the application is used in different application environments.

In another implementation, code can be examined to help determine whether the correct UI was accessed. That is, even if a particular UI control was not identified, other elements of the UI may remain unchanged. Taking the UIs 400 and 500 of FIGS. 4 and 5, it can be seen that, even though the add control 414 was changed to the create control 516, the other UI elements that are in close proximity to those controls are the same between the two interfaces. That is, the "copy," "where used," change log," and "delete" controls are located in the same section of the UIs.

While this could be determined using image comparison techniques, it can also be determined from the code, such using as the HTML 600 code of FIGS. 6A and 6B, and the DOM 700 of FIG. 7, as well as corresponding versions of the code and DOM for the changed UI having the "add" UI element being renamed to "create." As described, section information present in such code can facilitate such a comparison, in a similar way to how a region of interest can be used in image comparison techniques. In some cases, code-based comparison techniques can be beneficial, as they can use fewer computing resources than image-based techniques.

If it is determined at 816 that the test failed and was not on the correct screen, an error can be reported at 820, and the process 800 can end at 810. Otherwise, the process 800 can proceed to 824. At 824, it is determined whether section information is present, such as in code 818 for a reference version of the UI and code for the version of the UI being tested. In the case of a web application, the section information can be determined from HTML code or a DOM for the UI.

For example, in HTML, UI elements are defined using tags, such as <div>, <span>, <button>, and <input>. These elements can be nested within each other, creating a hierarchical structure. For instance, a <div> tag can contain a <button> and a <span>, making the <button> and <span> children of the <div>. A <div> tag can itself have one or more child <div> tags. Thus, this nesting can extend to multiple levels, where a child element can have its own children, and so on.

Each element serves as a node in the hierarchy, with the root typically being the <html> tag that encompasses the entire page structure. When a web page is loaded, the browser parses the HTML code and creates the DOM, a representation of the page's structure as a tree of objects. In the DOM, each HTML element is represented as a node, with the relationships between elements mirroring their nesting in the HTML code.

If the section information is not available from code for the UI, it can be determined at 828 whether section information can be extracted using image processing techniques. The image processing technique used in the determination at 828 can be at least similar to those performed using the ROI techniques described in conjunction with 816. In some cases, a single operation may be used to analyze UI screens to determine whether the test failed on the correct screen and to extract section information.

If it is determined at 828 that section information cannot be extracted using image processing techniques, UI elements can be extracted from the entire UI screen at 832. That is, in at least some cases the focus is primarily on identifying and extracting text associated with UI elements, such as buttons, labels, and system messages, rather than general displayed content.

In the case where UI elements are extracted from screenshots, rather than from UI code, the initial step is the application of image processing techniques to the screenshot. Image processing techniques can include parsing the image to identify distinct UI elements. Techniques like edge detection, contour analysis, and color segmentation may be employed to distinguish UI elements from the background and from each other. Machine learning techniques, including classifiers, can also be used for this operation.

Once the UI elements are identified, optical character recognition (OCR) can be applied these specific areas of the image. OCR technology is designed to recognize and convert different fonts and text styles from images into machine-readable text.

For the extraction process to be more focused on UI elements or system messages, the operations can be tailored to recognize common patterns or characteristics of such elements. For instance, text associated with buttons often appears within the boundaries of the button, and system messages frequently appear in predefined areas of the interface or are displayed in specific font styles or colors. By configuring the OCR to pay particular attention to these patterns, the extraction process can be more selective, filtering out irrelevant text.

As noted, in addition to OCR, the operations at 832 can incorporate machine learning techniques to enhance accuracy. A machine learning model can be trained on a dataset that includes various UI elements and their associated text, enabling it to better distinguish between text that is part of a UI element and text that is merely content. This training can include learning from examples of tooltips, labels, and system messages, thus refining the model's ability to identify and extract the desired text.

Furthermore, post-processing of the extracted text can be used to help ensure accuracy and relevance of extracted text. This post-processing may include cleaning up the text, correcting OCR errors, and validating the extracted text against known patterns or dictionaries to ensure that it accurately represents the text displayed on the UI elements (including validating it against code for the UI, if available for at least one version of the UI screen).

Returning to 824 and 828, if it is determined that section information is available (such as from code) at 824, or after extraction section information using image processing at 828, elements, particularly labels associated with UI elements, can be extracted from one or more sections of the UI at 838. In the case of image-based techniques, label extraction can be performed in a similar manner as the extraction described for the operations at 832. In the case of code-based techniques, extraction can be performed by extracting information regarding UI elements (such as the class, id, aria label, and text label, as described) from suitable code.

As described, depending on implementation, elements can be extracted from one or more sections. For example, elements for a parent or sibling level to a code level in which a UI element was supposed to be present, but was not found, can be extracted in addition to information for elements at the same level of the "missing" UI element. In order to help locate elements in the version of the code/screen associated with test failure, level information can be determined using code, if available, for a prior version of the UI. Levels associated with the missing UI element can be determined, and the corresponding levels of the code for the UI used when test failure occurred can be analyzed to extract element information.

When further analyzing elements for sections of a UI, a single section can be analyzed, or multiple sections can be analyzed. When a single section is analyzed, the section analyzed is typically the section in which the missing UI element was located in the reference code/screen. It is often desirable not to make major changes in the design of a UI, and so if a label for a UI element was changed, typically the updated label would be in the same location/section of the UI as the old label, and therefore in the same section of the UI either as reflected in the code or a screenshot.

However, in other cases, multiple sections can be analyzed, including based on various configuration settings. For example, a rule can be defined that sections having a threshold degree of relationship with the section with the original, missing UI element will be analyzed in the UI associated with test failure. The threshold, in one example, can be based on a level of indirection, such as levels that will be searched that are higher or lower than the level where the UI element was located in the reference UI, but to a maximum of two degrees of indirection. Other rules can specify that only higher or only lower levels than the reference level from the reference UI will be considered.

As discussed, actions can have various types, and those types can in turn be characterized differently. In particular, actions can be characterized as assertions (which can also be referred to as informational UI elements) or as interactive UI elements. Information UI elements (or assertions) can include elements, system as system messages, tooltips, notifications, and informational pop-ups. Interactive UI elements can include elements such as buttons, radio buttons, checkboxes, text input fields, and dropdown menus.

At 848, it is determined whether the action that resulted in test failure is an informational action (pertaining to an informational UI element). If not, and the action that resulted in test failure corresponds to an interactive UI element, the process 800 proceeds to determine similarities between the missing UI element and candidate UI elements extracted from all or a portion of the code or screenshot of the UI associated with test failure. Depending on earlier operations in the process 800, the text can be for elements associated with an entire UI, or for a particular section of the UI, whether determined from a screenshot or from code.

The process 800 can be adapted to use any suitable technique to determine whether a UI element in code or a screenshot may correspond to a missing UI element used in a test. Identifying whether two words, such as "Add" and "Create," have the same semantic meaning can use a variety of natural language processing (NLP) techniques. These techniques typically include the creation of text embeddings and performing similarity measurements between two embeddings being compared. Text embeddings are model-based numerical representations of words that capture their semantic meanings based on context and usage in language.

One suitable NLP is word2vec, a neural network-based model that generates vector representations of words. In word2vec, words that appear in similar contexts have vectors that are close to each other in the vector space. For example, "Add" and "Create" might be used in similar contexts in a dataset, and their vector representations corresponding positioned closely in the word2vec model's vector space. Once the embeddings are created, the similarity between these vectors can be quantified using various techniques.

Cosine similarity is a metric that can be used to measure the similarity of word embedding, and thus whether the words have the same or a common semantic meaning. Cosine similarity measures the cosine of the angle between two vectors, providing an indication of how similar they are in terms of orientation in the vector space. The closer the cosine similarity is to 1, the more semantically similar the words. Other measures that can be used include Euclidian distance or Manhattan distance, where shorter distances are associated with higher similarity.

Another way of analyzing the similarity of words is GloVe (Global Vectors for Word Representation). Like word2vec, GloVe is a model for generating word embeddings. GloVe combines matrix factorization techniques with context-based modeling, focusing on word co-occurrences within a corpus. That is, GloVe considers whether "Add" and "Create" are often used in similar contexts, as indicated by co-occurrence with the same set of words, such as if "Add" and "Create" both occur proximate terms such as "new," "item," or "record."

In addition to word2vec and GloVe, BERT (Bidirectional Encoder Representations from Transformers) can be used to compare word semantics. BERT is similar to GloVe, but where GloVe primarily considers words appearing before a given word, BERT considers words both before and after a given word.

Returning to the process 800, text embeddings for the original UI identifier/label and the candidate elements from the UI associated with test failure are obtained at 852. Similarity scores, such as cosine similarity, can be calculated at 856. At 858, it is determined whether the similarity scores satisfy a threshold, such that two UI elements can be considered semantically equivalent. In the case of multiple candidate UI elements satisfying a threshold, a UI element having the highest score can be selected, or additional processing can be performed. Additional processing can include calculating similarity using a different technique for analyzing text or using a different similarity metric. In the case where terms from a broader section of the UI are considered, a narrower subset of the section can be selected and a candidate UI element in that section selected.

However, the process 800 can use other techniques to determine what candidate UI element is most similar to a missing user information element, such as using artificial intelligence techniques (AI), including machine learning and generative AI (whether or not based on underlying machine learning techniques), which can replace one or more of the operations 852-858. In one example, a classifier model is trained to categorize word pairs as either semantically similar or not. A dataset containing word pairs labeled for semantic similarity can be used for training. Features for these models can be derived from word embeddings generated by word2vec, GloVe, or other models, such as BERT. The classifier, which can be a neural network, decision tree, or another algorithm, learns from these examples to predict the semantic relationship of new word pairs.

Generative AI models (or other types of natural language generators), such as GPT (Generative Pretrained Transformer), can also be employed in this context. Unlike word2vec or GloVe, which are primarily used for creating static word embeddings, generative models like GPT can dynamically generate text and understand contextual nuances. A phrase or sentence containing the word "add" can be provided as input to a model, with a query to generate a similar phrase or sentence using a word that has a similar meaning. The model's response can then be analyzed to see if it substitutes "Add" with "Create," indicating semantic similarity. In other cases, a more general prompt can be to ask the model whether two words (or phrases) are semantically equivalent, including in a particular context, such as a UI (where optionally the prompt can also include a description of the relevant software application that provides the UI).

If it is determined at 858 that terms for two UI elements satisfy a threshold, or are otherwise suitably similar, the test can be updated to use the new user element identifier at 862. In at least some cases, test execution can be held in abeyance pending the outcome of the process 800. In such cases, the operations at 862 can include continuing execution of the test.

As noted earlier, multiple tests can include the same UI element. Accordingly, a repository can be modified at 866 to update tests that use the UI element. That is, the repository can be queried to identify tests that use the missing UI element. The definitions of the tests can then be retrieved and modified to use the replacement/updated UI element. The process 800 can then end at 810.

If it is determined at 858 that the threshold is not satisfied for any candidate UI element, or a candidate element is not otherwise identified, the test execution can be assigned a failed status at 870, and the process 800 can end at 810. Optionally, a log associated with the test failure can indicate that the process 800 was executed and a replacement UI element was not identified.

Returning to operation 848, if it is determined that the action is an informational action, in some implementations the process 800 can proceed to 878, where a natural language inference (NLI) technique is used to determine whether text in a candidate replacement UI element entails information in a missing informational UI element (or vice versa). However, in other cases, particularly for single word information UI elements or informational UI elements having relatively few words, the operations described in 852-858 can be used, optionally with adaptations to improve performance if the informational UI element includes multiple words (or other textual tokens).

Techniques like word2vec, GloVe, or embeddings from advanced models like BERT or GPT can encapsulate the combined semantic implications of all the words used in an informational UI element. Text preprocessing can help improve accuracy when informational UI elements are associated with longer text. Preprocessing can include tasks such as tokenization, removing stop words, and stemming or lemmatization to improve the accuracy of similarity calculations. For longer texts, such as system messages, one approach is to calculate the embeddings for each word or phrase and then aggregate them to create a representation for the entire message. Aggregation methods like averaging or summing the word embeddings or using doc2vec, which extends word2vec to handle longer text, can be used.

The length of text can affect similarity calculations, with longer messages potentially introducing noise or less relevant information. Contextual embedding models like BERT, designed to handle longer text, can provide more accurate representations for semantic similarity tasks. They capture the contextual nuances within a message, considering the semantic context in which messages are used.

In another implementation, particularly when an informational user information element is associated with longer text, natural language inference (NLI) models can be used to compare the semantic relationships between a missing informational UI element and a candidate informational UI element. These NLI models can assess the semantic relationship between two text statements, identifying relationships of entailment, contradiction, and neutrality.

Entailment occurs when the truth of one text (the premise) implies the truth of another (the hypothesis). NLI models, like those based on transformers or BERT (or RoBERTa), can be used to analyze entailment relationships between longer texts in UI elements by predicting the likelihood of one text being an entailment, contradiction, or neutral in relation to another. As another example, NLI models that use a Siamese network architecture can be used. Siamese network architectures can involve training twin neural networks with shared weights to project two text inputs into a common embedding space. The semantic relationship can then be measured within this space, making it an effective approach for comparing the semantic content of longer UI texts.

Compared to word embeddings and similarity measures, such as cosine similarity, NLI models can assess semantic relationships in a more holistic manner, determining not only similarity but also entailment or contradiction in longer texts. To further improve accuracy, NLI models can be trained, or fine-tuned, using a data set that is based on text for informational UI elements, including informational UI elements associated with a particular software application or class of software applications, or specific types of UI screens (for example, those representing a similar task, even if the specific context of the task differs somewhat between the training examples).

Returning to the process 800, when NLI models are used, a NLI model can be called at 878 in response to determining at 848 that the missing UI element is an informational UI element. At 880 the NLI model is used to determine whether the recorded text, from the reference UI, entails text associated with the candidate informational UI element. If so, the process 800 can proceed to 862. Otherwise, the process can proceed to 870.

As an example of the process 800, consider the UI screens 400 and 500 of FIGS. 4 and 5. If the add UI element 416 of FIG. 4 is changed to the create UI element 516 of FIG. 5, the test defined in FIG. 2 may fail. If the code for the UIs associated with the UI screens 400 and 500 is available, the section information can be extracted from the code, such as the code 600 of FIGS. 6A and 6B or the code 700 of FIG. 7, and the UI elements 410, 412, 414, 516, and 418 can be compared with the add UI element 416, such as at operations 852-858. The comparison determines that "create" is most similar to "add," and so the test is updated at 862 to replace the add UI element 416 of FIG. 4 in the test definition of FIG. 2 to the create UI element 516 of FIG. 5.

Note that UI elements considered as possible replacements for a missing UI elements can be limited in other ways. For example, comparisons of UI code versions or screenshot versions can be used to identify UI elements that are common between two versions of the UI. If a different UI element is located in the updated UI, including in a particular section, that UI element can be processed at 852-880. In other words, in at least some implementations it may be possible to exclude unchanged UI elements from a process of determining a replacement/updated UI element.

Figure 9:
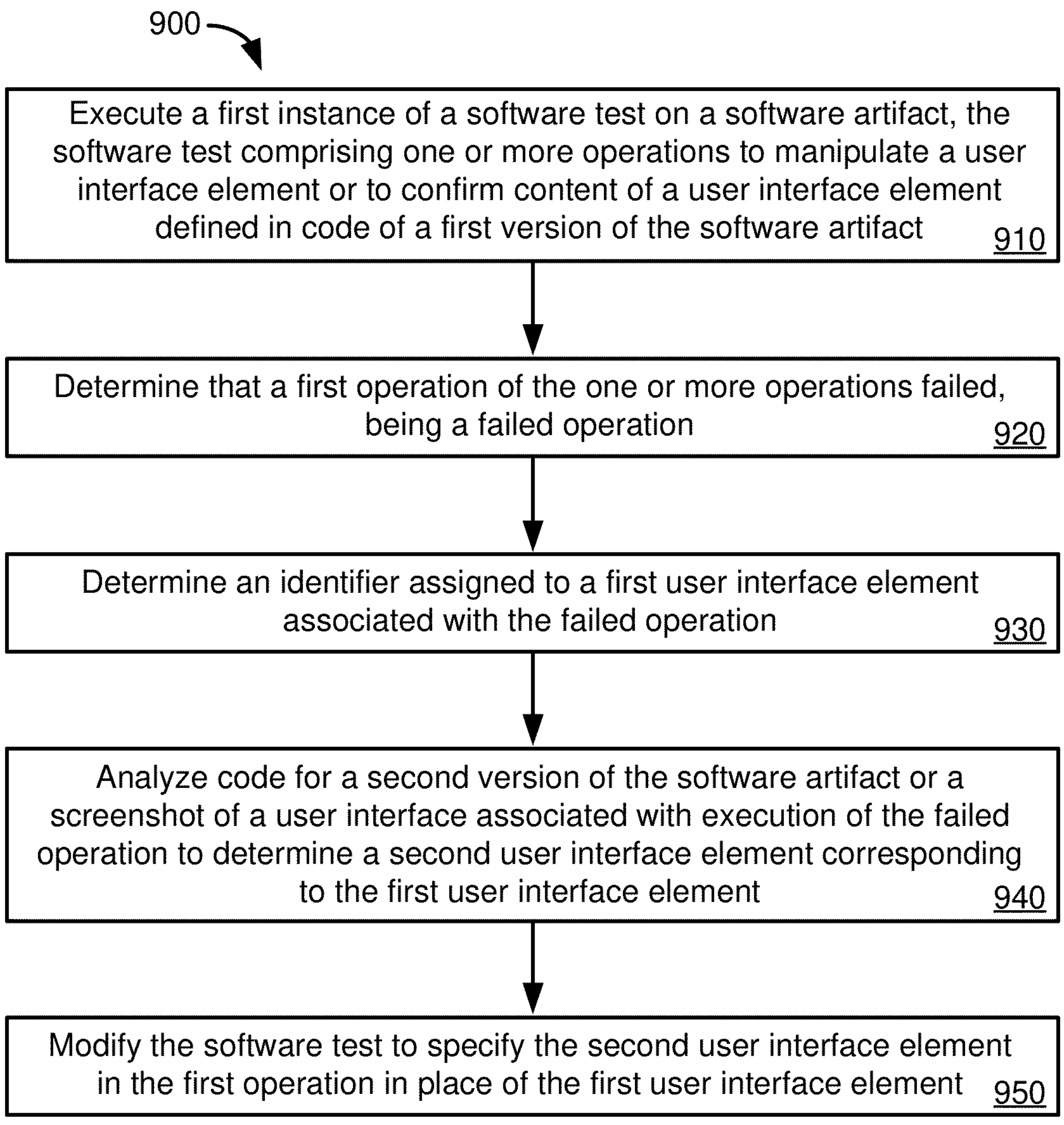
FIG. 9 is a flowchart of a process of automatically updating software tests based on a change to a user interface element of a tested user interface, reflected in a software artifact.

Example 5—Example Operations in Automatic Update of Software Tests Based on User Interface Element Changes FIG. 9 is a flowchart of operations in an example process 900 of automatically updating software tests based on a change to a user interface element of a tested user interface, reflected in a software artifact. At 910, a first instance of a software test is executed on a software artifact. The software test includes one or more operations to manipulate a user interface element or to confirm content of a user interface element defined in code of a first version of the software artifact. It is determined at 920 that a first operation of the one or more operations failed, being a failed operation. At 930, an identifier assigned to a first user interface element associated with the failed operation is determined. Code for a second version of the software artifact or a screenshot of a user interface associated with execution of the failed operation is analyzed at 940 to determine a second user interface element corresponding to the first user interface element. At 950, the software test is modified to specify the second user interface element in the first operation in place of the first user interface element.

Example 6—Computing Systems

Figure 10:
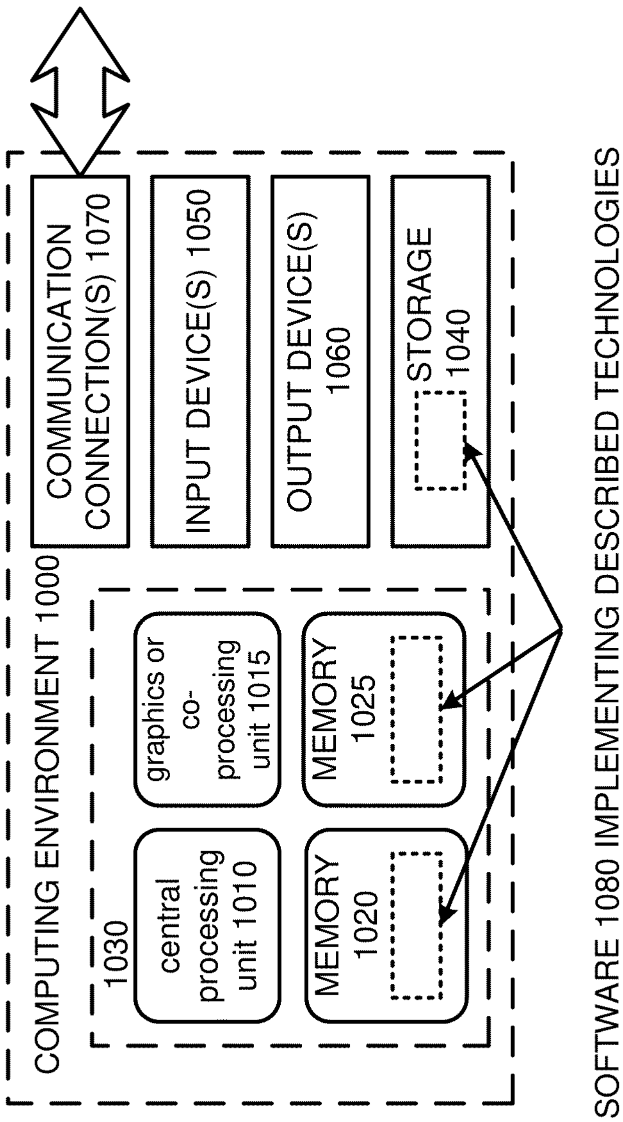
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing a database environment, and associated methods, described in Examples 1-5. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way, and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 7—Cloud Computing Environment

Figure 11:
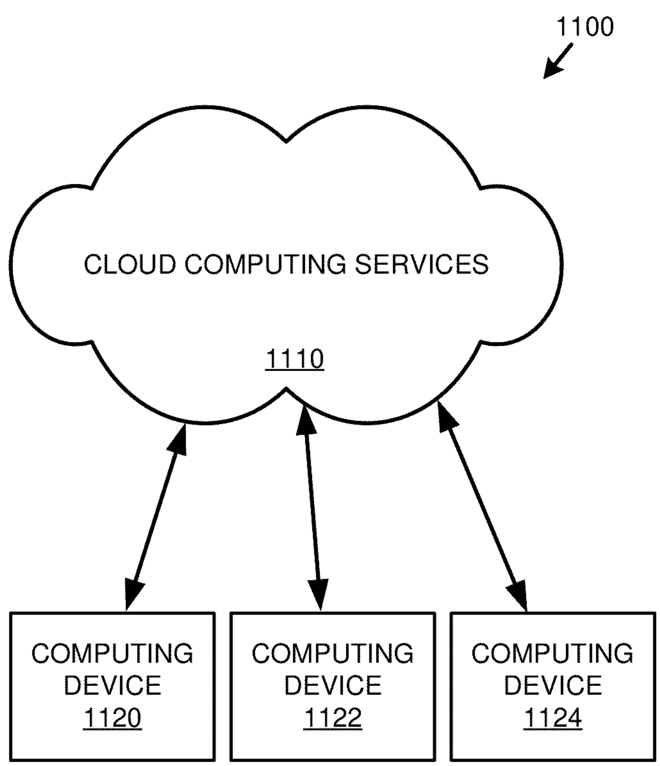
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operators (e.g., data processing, data storage, and the like).

Example 8—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, Structured Query Language, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:

at least one memory;

one or more hardware processor units coupled to the at least one memory; and one or more computer readable storage media storing computer-executable instructions that, when executed, cause the computing system to perform operations comprising:

executing a first instance of a software test on a software artifact, the software test comprising one or more operations to manipulate a user interface element or to confirm content of a user interface element defined in code of a first version of the software artifact;

determining that a first operation of the one or more operations failed, being a failed operation;

determining an identifier assigned to a first user interface element associated with the failed operation;

analyzing code for a second version of the software artifact or analyzing a screenshot of a user interface associated with execution of the failed operation to determine a second user interface element corresponding to the first user interface element, wherein determining the second user interface element comprises at least one of:

(i) comparing a first numerical representation of text in an embedding space for text of the identifier assigned to the first user interface element and a second numerical representation of text in the embedding space for text of an identifier of a candidate second user interface element to determine whether the identifier assigned to the first user interface element and the identifier of the candidate second user interface element are semantically equivalent; and (ii) providing the identifier assigned to the first user interface element and the identifier of the candidate second user interface element to a natural language inference model to obtain respective outputs and determining, based on the outputs, whether the identifier assigned to the first user interface element entails the identifier of the candidate second user interface element, the entailment indicating semantic equivalence between the identifiers; and modifying the software test to specify the second user interface element in the first operation in place of the first user interface element.

2. The computing system of claim 1, wherein analyzing the code for the second version of the software artifact or the screenshot of the user interface associated with the execution of the failed operation comprises:

determining the code for the second version of the software artifact is not available; and in response to determining the code for the second version of the software artifact is not available, analyzing the screenshot.

3. The computing system of claim 1, wherein analyzing the code for the second version of the software artifact or the screenshot of the user interface associated with the execution of the failed operation comprises analyzing the code for the second version of the software artifact.

4. The computing system of claim 3, wherein analyzing the code for the second version of the software artifact comprises:

scanning the code for the second version of the software artifact for identifiers of one or more user interface elements other than the first user interface element; and determining that an identifier of the second user interface element is semantically equivalent to the identifier of the first user interface element.

5. The computing system of claim 4, wherein determining that the identifier of the second user interface element is semantically equivalent to the identifier of the first user interface element comprises:

comparing the first numerical representation of text and the second numerical representation of text; and determining that a result of the comparing the first and the second numerical representations of text satisfies a threshold.

6. The computing system of claim 4, wherein the identifier of the second user interface element comprises a user interface class, a user interface identifier, an accessibility identifier, or text content assigned to the first user interface element.

7. The computing system of claim 4, the operations further comprising:

determining a first section of the code of the first version of the software artifact in which the identifier of the first user interface is located;

wherein determining an identifier in the second version of the code for the software artifact or the screenshot for the second user interface element corresponding to the first user interface element comprises scanning a corresponding section of code for the second version of the software artifact corresponding to the first section of the code.

8. The computing system of claim 7, wherein the first section of the code is defined as a level of HTML code, or a DOM generated from the HTML code.

9. The computing system of claim 4, wherein determining that the identifier of the second user interface element is semantically equivalent to the identifier of the first user interface element comprises:

providing the identifier of the first user interface element to the natural language inference model to provide a first result;

providing the identifier of the second user interface element to the natural language inference model to provide a second result;

comparing the first result with the second result; and determining that the first result entails the second result.

10. The computing system of claim 1, wherein analyzing the code for the second version of the software artifact or the screenshot of the user interface associated with the execution of the failed operation comprises analyzing the screenshot, the screenshot being a second screenshot generated by execution of the code for the second version of the software artifact.

11. The computing system of claim 10, the operations further comprising:

comparing the second screenshot to a first screenshot generated by execution of the code for the first version of the software artifact to extract identifiers of one or more user interface elements other than the first user interface element; and determining that an identifier of the second user interface element is semantically equivalent to the identifier of the first user interface element.

12. The computing system of claim 11, the operations further comprising:

extracting identifiers of user interface elements represented in the second screenshot;

comparing the first and second text numerical representations of text; and determining that a result of the comparing the first and the second numerical representations of text-satisfies a threshold.

13. The computing system of claim 11, the operations further comprising:

determining a section of the first screenshot in which the identifier of the first user interface is located in the first version of the code for the software artifact;

wherein determining an identifier in the second version of the code for the software artifact or the screenshot for the second user interface element corresponding to the first user interface element comprises scanning a section of the second screenshot corresponding to the section of the first screenshot.

14. The computing system of claim 11, wherein determining that the identifier of the second user interface element is semantically equivalent to the identifier of the first user interface element comprises:

providing the identifier of the first user interface element to the natural language inference model to provide a first result;

providing the identifier of the second user interface element to the natural language inference model to provide a second result;

comparing the first result with the second result; and determining that a result of the comparing the first result with the second result satisfies a threshold.

15. The computing system of claim 14, wherein determining that the result of the comparison satisfies the threshold comprises determining that the first result entails the second result.

16. The computing system of claim 1, the operations further comprising:

identifying one or more tests that comprise one or more operations to manipulate the first user interface element or to confirm content of the first user interface element; and modifying at least one of the one or more tests to specify the second user interface element in the first operation in place of the first user interface element.

17. The computing system of claim 1, the operations further comprising:

in response to determining that the first operation of the one or more operations failed, determining whether the software artifact is an expected software artifact by comparing identifiers for one or more user interface elements proximate the user interface in the software artifact to a reference version of the expected software artifact.

18. The computing system of claim 17, wherein the comparing the identifiers use code of the software artifact and code of the reference version of the expected software artifact.

19. A method, implemented in a computing system comprising at least one hardware processor and at least one memory coupled to the at least one hardware processor, the method comprising:

executing a first instance of a software test on a software artifact, the software test comprising one or more operations to manipulate a user interface element or to confirm content of a user interface element defined in code of a first version of the software artifact;

determining that a first operation of the one or more operations failed, being a failed operation;

determining an identifier assigned to a first user interface element associated with the failed operation;

analyzing code for a second version of the software artifact or analyzing a screenshot of a user interface associated with execution of the failed operation to determine a second user interface element corresponding to the first user interface element, wherein determining the second user interface element comprises at least one of:

(i) comparing a first numerical representation of text in an embedding space for text of the identifier assigned to the first user interface element and a second numerical representation of text in the embedding space for text of an identifier of a candidate second user interface element to determine whether the identifier assigned to the first user interface element and the identifier of the candidate second user interface element are semantically equivalent; and (ii) providing the identifier assigned to the first user interface element and the identifier of the candidate second user interface element to a natural language inference model to obtain respective outputs and determining, based on the outputs, whether the identifier assigned to the first user interface element entails the identifier of the candidate second user interface element, the entailment indicating semantic equivalence between the identifiers; and modifying the software test to specify the second user interface element in the first operation in place of the first user interface element.

20. One or more computer-readable storage media comprising:

computer-executable instructions that, when executed by a computing system comprising at least one hardware processor and at least one memory coupled to the at least one hardware processor, cause the computing system to execute a first instance of a software test on a software artifact, the software test comprising one or more operations to manipulate a user interface element or to confirm content of a user interface element defined in code of a first version of the software artifact;

computer-executable instructions that, when executed by the computing system, cause the computing system to determine that a first operation of the one or more operations failed, being a failed operation;

computer-executable instructions that, when executed by the computing system, cause the computing system to determine an identifier assigned to a first user interface element associated with the failed operation;

computer-executable instructions that, when executed by the computing system, cause the computing system to analyze code for a second version of the software artifact or to analyze a screenshot of a user interface associated with execution of the failed operation to determine a second user interface element corresponding to the first user interface element, wherein determining the second user interface element comprises at least one of:

(i) comparing a first numerical representation of text in an embedding space for text of the identifier assigned to the first user interface element and a second numerical representation of text in the embedding space for text of an identifier of a candidate second user interface element to determine whether the identifier assigned to the first user interface element and the identifier of the candidate second user interface element are semantically equivalent; and (ii) providing the identifier assigned to the first user interface element and the identifier of the candidate second user interface element to a natural language inference model to obtain respective outputs and determining, based on the outputs, whether the identifier assigned to the first user interface element entails the identifier of the candidate second user interface element, the entailment indicating semantic equivalence between the identifiers; and computer-executable instructions that, when executed by the computing system, cause the computing system to modify the software test to specify the second user interface element in the first operation in place of the first user interface element.

* * * * *